Oct. 1, 1963    H. LANZENBERGER    3,105,413
MACHINE TOOL FOR MACHINING CYLINDRICAL
AND CONICAL BORES IN WORKPIECES
Filed Sept. 5, 1961    2 Sheets-Sheet 1

INVENTOR
HORST LANZENBERGER
ATTORNEY

Fig. 3
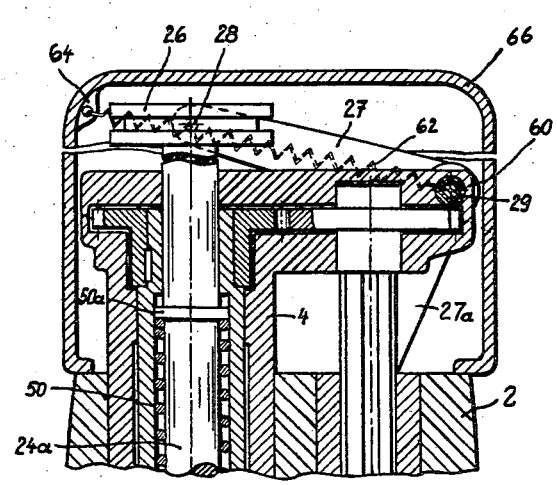
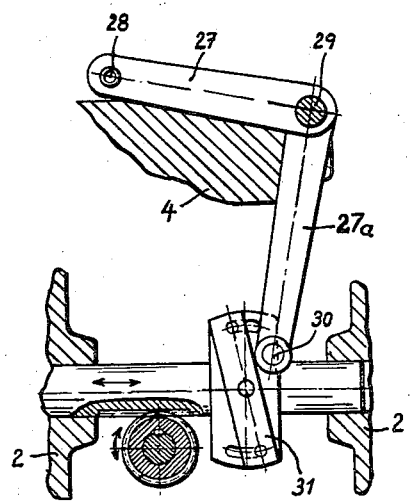
Fig. 4
INVENTOR.
HORST LANZENBERGER
BY
Rupert J. Brady
ATTORNEY 3,105,413
MACHINE TOOL FOR MACHINING CYLINDRICAL AND CONICAL BORES IN WORKPIECES
Horst Lanzenberger, Munich, Germany, assignor to Hans Deckel, Munich, Germany, and Friedrich Wilhelm Deckel, Zug, Switzerland
Filed Sept. 5, 1961, Ser. No. 136,701
Claims priority, application Germany Sept. 23, 1960
6 Claims. (Cl. 90—14)

The present invention relates to an improvement in machine tools, such as grinding, milling, and the like, machines for machining cylindrical and conical bores in fixed workpieces. More particularly the invention relates to an improvement in such a machine having a rotatable axially movable spindle guided within a hollow spindle which is axially movable relative to a movable control cam and wherein axial movement is imparted to the rotatable axially movable spindle by an arm of a knee lever whose support participates in the axial movement of the hollow spindle and whose other arm through spring pressure bears against a control cam for imparting such movement. A machine of this type, and of the type for which the present invention is an improvement, is shown and described in U.S. Patent 2,929,300 issued to Kurt Zwick on March 22, 1960, and this patent is incorporated by reference and made a part of this disclosure and relied upon insofar as details of the construction and operation of the machine, which are not disclosed in the present application, since such details may be the same as those disclosed in said patent.

In Patent 2,929,300 a machine for grinding cylindrical and conical bores in fixed workpieces is shown and claimed, wherein a vertically disposed rotationally driven main spindle is equipped with a radially adjustable tool holder for a tool such as a rotating grinder spindle. In such a machine the adjusting of the tool holder can be carried out at a particular desired point during the machining operation or the adjustment can be carried out continuously during the machining operation, and the radial adjustment of the tool holder is effected by the longitudinal displacement of another spindle, arranged parallel to the main spindle axis, as well as through an adjusting member revolving with the tool holder.

A grinding spindle is disposed in the tool holder on the raisable and lowerable main spindle and the tool holder is adapted for planetary revolution thereon. The distance of the grinding spindle from the main spindle axis is adjusted automatically as a function of the lift movement of the main spindle, so that inclined generated surfaces of rotation, particularly walls of conical holes or bores in workpieces, can be machined. The offset distance of the grinding spindle from the main spindle axis is adjusted by a master control cam disposed on a stationary part of the machine. The master cam can be set with respect to desired offset distance and angular position relative to the main spindle axis. Upon a vertical movement of the main spindle support and hence of the grinding tool, the selected master cam setting influences the axial adjustment of the other spindle relative to the main spindle support through a spring-loaded intermediate drive comprising an angle lever mounted on the main spindle support and having a feeler roll thereon guided by the master cam. As the angle lever is pressed against the master cam under the load of a spring, a component of the spring force acts on the main spindle support at the point of the seating or mounting of the angle lever thereon. Experimentation and use of the machine has shown that this component of force, thus developed, is sufficient to push the main spindle support into an eccentric position while at the same time driving out the oil film from one side of its track and thus distorting or falsifying the true vertical position of the grinding spindle.

It is, therefore, an object of the present invention to provide a construction of machine tool, of the type described, in which the main spindle support is maintained on a truly aligned axis so as to render an accurate axis of rotation for the grinding tool.

Another object of my invention is to provide an attachment for machine tools of the type described wherein a concentric oil film is maintained around the track of the main spindle support.

A further object of the invention is to provide a construction of improvement for machine tools of the type described for counterbalancing the bearing reaction force which presently produces erroneous positioning of the spindle axis during machining operations.

Other and further objects of the invention reside in the increased accuracy and machining tolerances obtainable by use of the improvement of my invention as set forth more fully in the specification hereinafter following by reference to the accompanying drawings, in which:

FIG. 3 is a fragmentary sectional view of a portion of FIG. 2, and particularly showing the connections of the recationary force-compensating means according to the invention; and FIG. 4 is a side elevation view partly in cross-section showing the master control cam set at an angle and the manner in which the angle lever is supported on the main spindle support and controlled by the cam.

Figure 1:
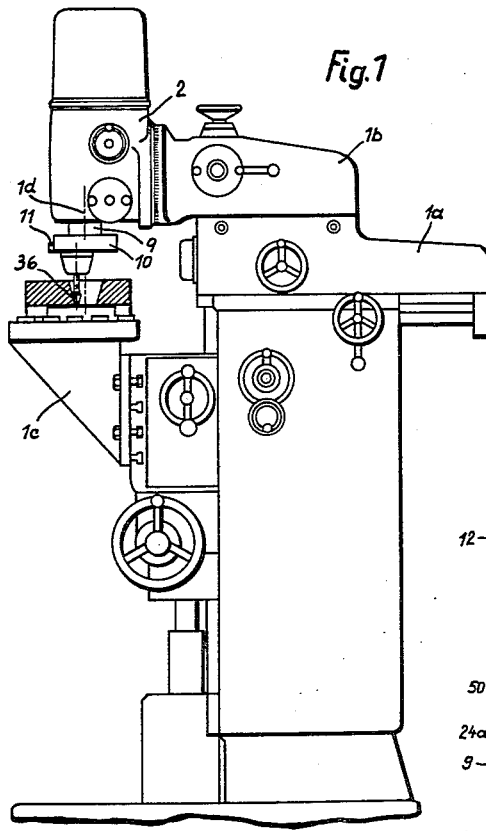
FIG. 1 is an elevation view of a machine fitted with a grinding tool.
Figure 2:
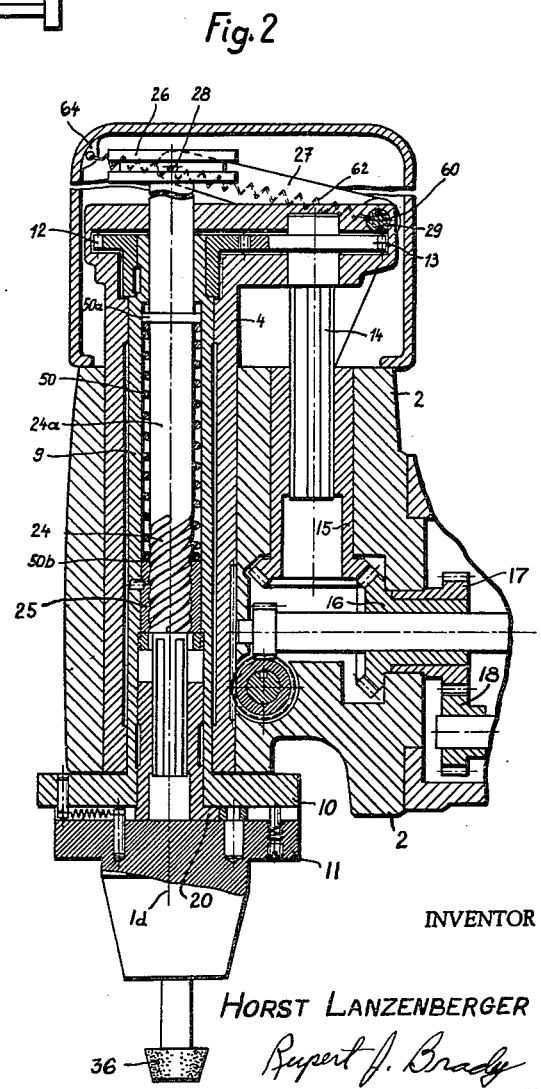
FIG. 2 is a vertical sectional view of the adjustable tool holder mechanism and drive.

In the machine of FIG. 1, according to Patent 2,929,300, a saddle 1a, slidable on the machine pedestal support, a casing 1b held and secured thereto in suitable mounting. A grinding or milling head 2 which carries the tool holder is adjustably mounted on a horizontal pivot on casing 1b and may be clamped at any desired angle with respect thereto. Interiorly of the milling head a sleeve or main spindle support 4 is provided for longitudinal movement with respect to the grinding head 2. The mechanism for effecting this axial movement is described in Patent 2,929,300.

A main spindle 9 is disposed for rotation within main spindle support 4 and carries at the lower end thereof a block 10 for mounting a tool holder 11, more fully described in said prior patent. The tool holder 11 is thus rotationally driven by main spindle 9 rotating about axis 1d. As shown in FIG. 1, a grinding tool 36 may be carried by tool holder 11, the grinding tool or spindle having its own driving means, such as pneumatic turbine, for machining the interior surface of a cylindrical or conical bore of a workpiece supported on a work table indicated generally at 1c. A driving gear 12 is secured to the upper portion of the rotatable main spindle 9 and a pinion 13, integral with a splined shaft 14, meshes with gear 12 and rotary movement is imparted to the main spindle and the block 10 through the gear train formed by the gear wheels 12, 13, 15, 16, 17 and 18 and the prime mover of the machine.

As described in Patent 2,929,300 the radius of the gyratory or planetary motion of the tool 36 is adjusted by means of a flat cam element 20 which is rotationally disposed within the main spindle 9 and is rotatable therewith, and relative thereto to shift the axis of the grinding spindle or tool 36 with respect to the main spindle axis 1d. The splined end of an inner spindle 24a engages an extension of cam 20, extending interiorly of main spindle 9. The spindle 24a, carries course-pitch threads 24 thereon which engage in a nut 25, which is rigidly secured inside the hollow main spindle 9. When spindle 24 is axially displaced it is, at the same time, forced to perform a rotary movement in relation to the main spindle 9, through the medium of the nut 25. A grooved flange 26, carried at the upper end of spindle 24a, is engaged by the cross-head pins 28 of a bifurcated crank or angle lever 27 which is fulcrumed by its bolt 29 on the upper portion of main spindle support member 4. The other arm 27a of the angle lever carries a roller 30 which makes contact with the edge of a master control cam 31. Master cam 31 may be selectively adjusted to a desired position on its associated plate which is mounted on a shaft which is axially shiftable by means of an arrangement of control gearing. To maintain constant contact between roller 30 and master cam 31, a spring member 50 is arranged around the spindle 24a in a space intermediate 24a and main spindle 9, with one end of the spring bearing against a collar 50a carried by the inner spindle, and the other end of the spring bearing against the upper surface of the nut 25.

Thus from the foregoing, and from the description of Patent 2,292,300, it is readily understandable that the tool holder 11 performs a rotary motion through the main spindle 9 and an up and down movement through the main spindle support sleeve 4 which moves axially with respect to the grind head 2. The crank lever 27 also moves up and down with respect to main spindle support 4 so that its roller 30 will run up and down the face of master cam 31 which does not itself move in the vertical plane, but which can be shifted axially in the horizontal plane. When the master cam 31 is set at an angle as shown, the crank lever 27 is made to perform a rocking movement with up and down movement at its bifurcated end and through pins 28 engaged in the grooved flange 26, thus imparts an additional working movement to spindle 24a. This imparted axial movement of spindle 24a also impresses a rotary movement on spindle 24a due to nut 25 and the screw motion thus performed transmits a radial movement to cam element 20 with respect to block 10 so that a transverse motion is imparted to the tool holder 11 with respect to block 10 thus offsetting the axis of the spindle of the grinding tool 36 with respect to the main spindle axis 1d. The additional transverse motion created by the angle master cam 31 and the cam element 20 is, therefore, superimposed upon the rotational movement and vertical reciprocation of the tool holder 11. The additional axial displacement of spindle 24a is merely a relative motion between this spindle and control cam 20 and no axial movement is imparted from this motion to either main spindle 9 or main spindle support 4. Consequently, when main spindle support 4 is moved downwardly by the tool feed, the above described train of elements 31, 30, 27a, 27, 28, 26, 24a, 25 and 20 causes a transverse or offset movement of the tool holder 11 so that the radius of gyration gradually and steadily decreases, thus making it possible to machine, such as by grinding, a tapered or conical hole within a workpiece.

By the action of spring 50 pushing up upon collar 50a of inner spindle 24a, thus transferring an upward component of force to lever arm 27 through pins 28 to cause roller 30 and arm 27a to be maintained in abutment with master cam 31, a bearing pressure or reaction force is formed at bolt 29 and transferred to the main spindle support 4 at this pivot point, thus causing the main spindle support 4 to be pressed at its upper end against the bore wall of the grinding head 2 in which it is supported, and this causes the axis of the spindle assembly to become cocked or diverted in its true axially aligned position and can thus result in inaccuraces in machining or grinding operations. The main spindle support 4, due to this force component imparted to it by the lower arm mechanism, displaces the oil film between it and the bore wall of the grinding head 2, and thus occupies an eccentric position within the grinding head supporting bore which greatly impairs the accuracy obtainable with the grinding spindle due to the displacement of its axis. In order to avoid the transmittal of this error-producing reaction force to main spindle support member 4, according to the invention, bolt 29 is provided with a pin 60 placed axially within its hollow bore, and the covering hood 66 connected with the grinding head 2 is provided with an eye extension 64, and a tension spring 62 is connected intermediate pin 60 and eye extension 64 to produce through its tension force a substantially equilibriant force which is opposed to the direction and average magnitude of the error-producing reactionary force which is imparted to main spindle support member 4 by spring 50, lever arm 27 and cam 31 through the pivot connection of the lever member to main spindle support 4 at pivot bolt 29. Thus this reactionary force, provided by tension spring 62, maintains the axis 1d of the spindle assembly in true alignment at all times to increase the machining accuracies obtainable with a machine according to the present disclosure.

While I have described my invention in one of its preferred embodiments I realize that modifications may be made and I desire that it be understood that no limitations upon my invention are intended other than may be imposed by the scope of the appended claims.

What I claim as new and desire to secure by Letters Patent of the United States, is as follows:

1. A machine tool comprising a frame, spindle support means axially adjustable in said frame, hollow driving spindle means carried for rotational movement by said spindle support means, a member arranged coaxially within said hollow driving spindle means, cam means associated with said member, lever means pivoted on said spindle support means and having a portion engaging said member and a portion engaging said cam means for axial displacement of said member within said hollow driving spindle means when said spindle support means is moved axially, means connecting said member and said hollow driving spindle means, resilient means connected with said member for maintaining said portion of said lever means in engagement with said cam means, and means connected intermediate said frame and said spindle support means to counterbalance the force on said spindle support means produced by said resilient means, lever means and cam means.

2. A machine tool as set forth in claim 1 in which said means connected intermediate said frame and said spindle support means is comprised of resilient means.

3. A machine tool as set forth in claim 1 in which said means connected intermediate said frame and said spindle support means is a resilient tension spring.

4. A machine tool as set forth in claim 1 in which said means connected intermediate said frame and said spindle support means produces a compensating force opposed to the bearing reaction force produced on the cam means by the pressure of said lever means biased thereagainst by said resilient means.

5. A machine tool as set forth in claim 1 in which said means connected intermediate said frame and said spindle support means is connected to the spindle support means through the pivot of said lever means.

6. A machine tool comprising a frame, spindle support means adjustably carried by said frame, a hollow driving spindle terminating in a flange extending in a plane normal to the axis of the spindle carried by said spindle support means, a rotating tool holder carried by and displaceable on said flange with respect to the axis of said driving spindle, a control cam disposed intermediate said flange and said tool holder and extending into contact with said tool holder, a portion of said cam extending into the flange end of said hollow spindle, a member arranged coaxially within the hollow driving spindle, said member having a screw thread engaged with a screw threaded element secured to the hollow spindle, said member engaging and being axially movable with respect to the portion of said control cam extending into said hollow spindle, whereby axial movement of the member relative to the driving spindle produces relative rotation between the member and the driving spindle to rotate said cam and displace said tool holder, a master cam element associated with said member, a crank lever pivoted on said spindle support means and having a portion engaging said member and a portion engaging said master cam element for axial displacement of said member when said spindle support means is fed axially, resilient means connected with said member for maintaining said crank lever in contact with said master cam element, and means connected intermediate said frame and the crank lever pivot for accurately maintaining true the axis of said hollow spindle.

No references cited.